Figure 1:
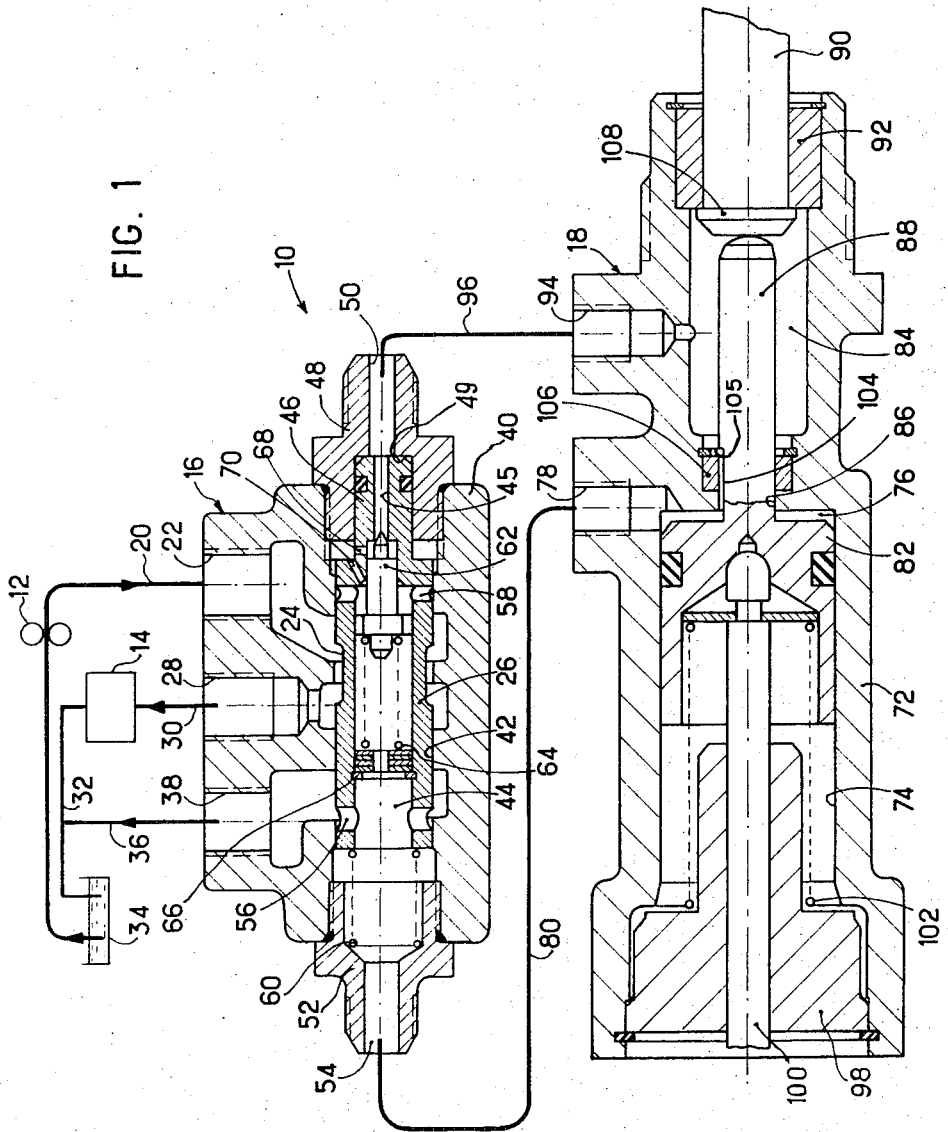

United States Patent [19]
Thomas

[11] 3,831,491
[45] Aug. 27, 1974

[54] BRAKE BOOSTER

[75] Inventor: Alfred William Thomas, Bubingen, Germany

[73] Assignee: Deutsche Bendix Aurustungs GmbH, Saarbrucken, Germany

[22] Filed: May 4, 1972

[21] Appl. No.: 250,397

[30] Foreign Application Priority Data
   May 25, 1971  Germany.............................. 2125880

[52] U.S. Cl.......................... 91/391, 91/460, 91/468
[51] Int. Cl................................................ F15b 9/10
[58] Field of Search ............. 91/460, 391; 60/54 CP

[56] References Cited
UNITED STATES PATENTS

| | | | |
|---|---|---|---|
| 2,852,920 | 9/1958 | Stelger | 91/391 R |
| 2,977,934 | 4/1961 | Pulkownik | 91/460 |
| 3,103,786 | 9/1963 | Hager | 60/54 CP |

FOREIGN PATENTS OR APPLICATIONS

| 174,396 | 1/1922 | Great Britain | 91/460 |
|---|---|---|---|

*Primary Examiner*—Paul E. Maslousky
*Attorney, Agent, or Firm*—Ken C. Decker; William N. Antonis

[57] ABSTRACT

A hydraulic booster is disclosed which includes a piston which is actuated by fluid pressure communicated into the booster from an external source by a spool valve. An operator-actuated input rod generates fluid pressure in a control chamber when the booster is actuated. The pressure generated in the control chamber shifts the spool valve to a position admitting fluid pressure to the piston.

12 Claims, 2 Drawing Figures

BRAKE BOOSTER

The invention relates to a power boost mechanism responsive to an operator operated actuation of an input element for controlling the hydraulic force adapted to act on an output motor. For example, such power boost mechanism may be located in a vehicle hydraulic brake system wherein said input element and said output motor are provided by a brake pedal and a master cylinder, respectively.

It would be easily understood that for evident reasons of security such a power boost mechanism must comprise means adapted to permit a manual actuation of said output motor in case of failure of hydraulic pressure.

There has already been proposed a mechanically controlled power boost mechanism comprising servo valve means movable in a valve housing for controlling a variable working fluid pressure acting on an output piston sealingly received in a working chamber of an output servomotor, said servomotor being connected to and actuated by a mechanical lever assembly which is operatively connected to said output piston and to an operator operated input control member to be actuated by relative displacement between said piston and said member, said lever assembly comprising a telescopic resilient connection adapted to allow said input control member to directly engage said output piston member for actuating the latter under pressure power-off operating conditions.

With a view to substantially simplifying the construction of the power boost mechanism and eliminating the mechanical lever assembly thereof the invention proposes a hydraulically controlled power boost mechanism comprising servovalve means movable in a valve housing for controlling a variable working fluid pressure acting on an output piston sealingly received in a working chamber of an output servomotor wherein said servovalve means are responsive to a control pressure of a hydraulic fluid contained in a control chamber and actuated thereby, said control pressure varying as a function of the displacement in said chamber of an input plunger and of an output plunger operatively connected to said output piston.

It would easily be understood that said input plunger may be operatively disposed in said control chamber to engage said output plunger in case of failure of said working pressure for permitting the manual actuation of said output piston.

Moreover, the car manufacturers generally seek to obtain the minimum input member displacement for the maximum output piston displacement during pressure "power-on" operating conditions. Such a problem cannot be easily solved with a mechanically controlled power boost mechanism for reasons of size and strength of the different components of lever assembly. On the contrary in s hydraulically controlled power boost mechanism according to the invention the input plunger - output plunger effective area ratio may be chosen to obtain the best input plunger - output piston stroke ratio.

Furthermore, this often happens during the operation of the power boost mechanisms momentary lack of working pressure, for example when servovalve means, generally consisting of a spool valve, are jammed in its bore. In mechanically controlled boost mechanisms, as the vehicle operator firmly depresses its brake pedal to actuate the output piston, the spring of the telescopic resilient connection is compressed. It results therefrom that the spool valve is yieldably urged towards its full-power position. Then, if due to the vehicle vibrations, the spool valve is rendered free to move, high pressure fluid will surge into said servomotor chamber and cause a brutal vehicle deceleration which can be very dangerous.

Thanks to a further feature of the invention, the hydraulically controlled power boost mechanism comprises a relief valve responsive to the differential of pressure existing between said control pressure and said working pressure adapted to allow fluid to escape from said control chamber when said differential of pressure reaches a predetermined value.

As explained in detail later, during "power-off" condition operation, the relief valve permits said input plunger to directly engage said output plunger. Then, since the connection between the input plunger and the spool valve is incompressible fluid, even if the jammed spool valve is free to move, it will not move because there is no system elasticity to make it move.

Figure 2:
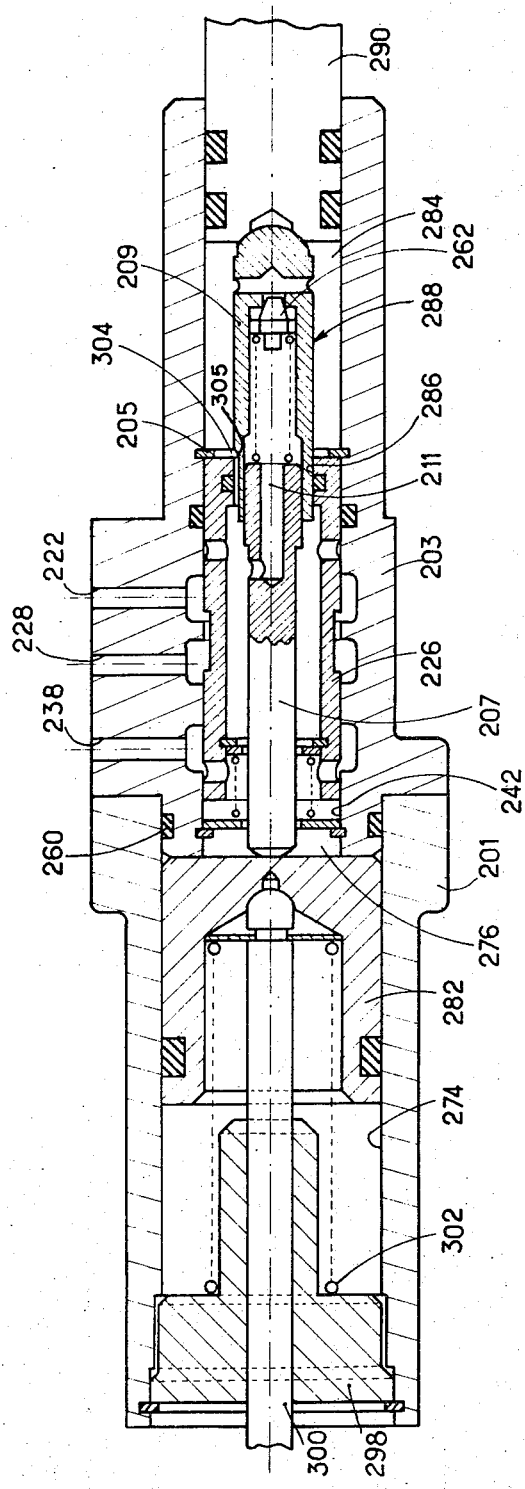

Other features of the invention will appear in the following description taken in reference with the accompanying drawings in which:

FIG. 1 is a diagrammatic view of a vehicle braking system including a power boost mechanism according to the invention, shown in sectional view, and, FIG. 2 is a sectional view of another embodiment according to the invention of a power boost mechanism.

When considering the system of FIG. 1, a power boost mechanism 10 disposed between a power steering pump 12 and a power steering gear 14, essentially comprises a control valve 16 and an output servomotor 18. In such a system fluid flows from pump 12, via conduit 20 to an inlet port 22 of control valve 16. Fluid flows through the control valve 16 via a groove 24 provided in a spool valve 26 to an outlet port 28, and thence, via a conduit 30 to the power steering gear 14. As the steering gear 14 is normally controlled by an open center valve (not shown) the fluid returns via a conduit 32 to the pump reservoir 34. Conduit 32 is provided with a T-fitting to which a conduit 36 from a return port 38 of control valve 16 is assembled.

Referring now to control valve 16, it comprises a valve housing 40 with a bore 42 therein communicating with an inlet port 22, an outlet port 28, and a return port 38. Bore 42 slidably receives the spool valve 26 which is provided with a longitudinal passage 44. As shown on the FIG. 1, one end of the spool valve 26 presents a smaller diameter portion 46 which is sealingly received in a cap 48 secured to housing 40 to close one end of bore 42. Cap 48 includes a control port 50 communicating with a channel 45 of portion 46. The other end of bore 42 is closed by a plug 52 secured to housing 40. The plug 52 is provided with a working port 54 communicating with passage 44.

The spool valve 26 is provided with a first set of holes 56 cooperating with bore 42 to control the exhaust communication between return port 38 and working port 54, and with a second set of holes 58 cooperating with bore 42 to control supply communication between inlet port 22 and working port 54. As shown in FIG. 1, a spring 60 abutting plug 52 yieldably urges spool valve 26 towards a shoulder 49 of cap 48 into its normal rest position wherein said exhaust communication is opened and said supply communication is closed.

A relief valve 62 is mounted in spool valve 26 between passage 44 and channel 45. A spring 64 abutting a washer 66 secured in spool valve 26 urges said relief valve to its closed position. As explained in detail later, when said relief valve 62 is opened fluid flows from bore 45 to passage 44 through apertures 68 and 70 provided in spool valve 26.

Referring now to servomotor 18, it comprises a housing 72 with a bore 74 therein, sealingly receiving an output piston 82 to define a working chamber 76. Working chamber 76 communicates with working port 54 of control valve 16 via a port 78 and a conduit 80. A control chamber 84 is defined by a cavity adjacent said working chamber 76 communicating therewith through an aperture or conduit 86, which sealingly receives a rod portion of output piston defining an output plunger 88. Output plunger 88 is aligned with an input plunger 90 projecting into control chamber 84 through a seal block 92. Input plunger 90 is secured to the usual vehicle brake pedal (not shown). Control chamber 84 communicates with control port 50 of control valve 26 via a port 94 and a conduit 96.

A plug 98 mounted in bore 78 slidably receives a push rod 100 abutting output piston 82. Push rod 100 is operatively connected to a master-cylinder (not shown) of any type. A spring 102 abutting plug 98 yieldably urges output piston 82 and output plunger 88 which is in engagement with input plunger 90 to their rest position corresponding to the abutment between the flat head 108 of input plunger 90 and seal block 92 secured to the servomotor housing. A flat 104 provided on output plunger 88 cooperates with a seal block 106 mounted in aperture 86 to permit, when output plunger 88 is in its rest position, a refill communication from working chamber 76 to control chamber 84.

The power boost mechanism as hereinabove described comprises two units, i.e., control valve 16 and servomotor 18 which are connected together by two conduits 80 and 96. Such a structure provides a substantial advantage since two small packages can often be installed in a vehicle where one larger package cannot. Obviously, to avoid pipework the two units can with minor corrections, be bolted together when installation convenience allows.

It should be also pointed out that, with such a power boost mechanism, car manufacturers can easily dispose the control valve 16 close to the power steering valve to obtain the best operation of the steering unit, as those skilled in the art will understand.

Furthermore, the separation of the unit into two parts facilitates the use of aluminium alloys for the servomotor 18, where because all moving posts are sealed elastomerically, considerations of leakage due to differential expansion do not arise. The control valve 16 is made of ferrous alloy so that the close clearances required between spool valve 26 and valve housing 40 can be maintained under all temperature conditions.

FIG. 2 shows a compact coaxial construction of a power boost mechanism according to the invention, whose components which are substantially the same as those of the embodiment shown in FIG. 1 retain the same reference numeral added to the number 200 and will not be described in detail again.

The power boost housing includes two portions 201 and 203 bolted together. As shown in the drawing, portion 201 is provided with a bore 274 sealingly receiving output piston 282. A push rod 300 cooperates with output piston 282 to actuate a usual master cylinder (not shown). Portion 203 is provided with a bore 242, one end of which communicating with inlet port 222, outlet port 228 and return port 238 receives an annular shaped spool valve 226, similar to spool valve 26, whereas the other end of the bore 242 receives an input member 290. A spring 260 yieldably urges spool valve 226 towards its rest position in abutment with a washer 205 secured to portion 203.

The major difference between the two embodiments of the invention is that the output plunger 288 is coaxially and sealingly mounted in a passage 286 provided in the spool valve 226. Referring to FIG. 2, working chamber is defined by the left portion of bore 242 with respect to passage 286, and control chamber is defined by the right portion of bore 242. Output plunger 288 consists of two screwed stems 207 and 209 respectively cooperating with output piston 282 and input plunger 290. Spring 302 abutting a plug 298 normally urges output piston 282 towards its rest position in engagement with housing portion 203. Furthermore, a suitable resilient member (not shown) yieldably urges input plunger 290 towards output plunger 288, itself in abutment with output piston 282, thereby output plunger 288 and input plunger 290 are in their rest positions illustrated in FIG. 2. A flat 304 is provided on stem 209 to permit, when the output plunger 288 is in its rest position a refill communication from working chamber 276 to control chamber 284.

A relief valve 262 is mounted in a passage 211 provided in output plunger 288. A spring 64 abutting stem 207 urges said relief valve in its rest closed position. As explained in detail later, when said relief valve 262 is opened fluid flows from control chamber 284 to working chamber 276 through passage 211.

The operation of the power boost mechanism illustrated in FIG. 1 under "power-on" conditions is as follows:

The spool valve 26 is at rest position to open fluid supply for power steering 14 through flat 24. The working chamber 76 is connected to reservoir 34 since the exhaust communication through hole 56 is opened. The control chamber is also connected to reservoir 34 via flat 104 on output plunger 88.

When considering FIG. 1, brake pedal force being applied to input plunger 90, it moves to the left thus pushing output plunger 88. Approximately 1 millimetre of movement serves to close land 105 against the seal block 106 to thereby terminate fluid communication through the passage defined between the close flat 104 and the seal block 106. This movement should also suffice to take up some part clearance of the unit. Further movement of input plunger displaces fluid from control chamber 84. At this point since only minimal pressure in control chamber is being developed, fluid flow through port 94 does not take place. But as shown in FIG. 1, input plunger 90 has a cross-sectional area twice that of the output plunger 88, so that the fluid medium in the chamber 84 acts on the input plunger 90 and the output plunger 88 to cause the output plunger 88 and the output piston 82 to move to the left at twice the rate of the input plunger 90. Eventually, the master cylinder actuation encounters some resistance and measurable pressure has to be developed in control chamber in order that the braking stroke can be developed. Control pressure is applied to spool valve 26 via port 94, conduit 96 and port 50. When the control pressure exceeds tentatively 3 kg/cm2 the resistance to spool valve 26 movement afforded by return spring 60 is overcome and the spool valve 26 moves to the left. As illustrated in FIG. 1, since the input plunger area is about 2½ times the area of spool valve portion 46, the spool valve 26 moves at 2½ times the rate of the input plunger. The spool valve in moving to the left tends to close off flat 24 between inlet port 22 and outlet port 28 to the power steering 14, closes off holes 56 to return port 38 and opens holes 58 to inlet port 22. High pressure from pump 12 is applied via spool valve passage 44, working port 54, conduit 80 and port 78, to working chamber thereby actuating the output piston 82. The spool valve 26 is partially balanced end to end by passages 70 and 68 leaving the valve smaller portion 46 "out of balance". Due to the load of return spring 60 and the generally high value of working pressure during operation (tentatively 50 kg/cm2), the working pressure at spool valve equilibrium is slightly lower than the control pressure. The pressure on the area of portion 46 naturally is reacted by input plunger 90. This same pressure is also applied to the output plunger 88 so the whole of the surface area of output piston is substantially subjected to the same pressure. Finally the working pressure achieved is relative to the stroke towards the left of the spool valve 26 which in turn is proportional to the stroke of the input plunger 90. The force developed by the output piston 82 is therefore substantially proportional to the force acting on the input plunger 90 in the ratio of output piston area/input plunger area the value of which being 4 in the embodiment illustrated in FIG. 1. Upon release of the brake pedal force under "power-on" conditions, the reverse of the above described actions take place.

Let us consider now operation of the power boost mechanism under "power-off" conditions. There are three basic sets of circumstances in which the power-off condition is required;

case 1: A "pressure failure", by way of example the collapse of the power steering pump;

case 2: A "mechanical failure", though pressure is available at the inlet port of the control valve, the spool valve may fail to move under the control pressure developed in control chamber because of mechanical jamming caused for instance by contaminants;

case 3: A catastrophic "Hydraulic failure", resulting in the loss of system fluid;

In the three above cases pressure in the working chamber cannot be developed and the operation of the power boost mechanism is as follows:

case 1: The initial operation is as described under "power-on" condition until and including the excursion to the left of the spool valve 26. Excursion of spool valve 26 causes however no corresponding rise in working pressure since no system pressure is available from pump 12. Further force will instinctively be applied to the brakepedal by the vehicle's driver. This force will cause control pressure in chamber 84 to rise (until at about tentatively 4 kg/cm2), relief valve 62 is forced of its seat against the force of spring 64 and fluid is discharged via apertures 68 and 70, port 54 to working chamber which is of course under no pressure. Then input plunger 90 can engage output plunger 88 so that the input plunger/output piston stroke ratio becomes equal to unity.

If during operation power pressure can be available at inlet port 22, since the control pressure is about 4 kg/cm2, the transition form power-off to power-on conditions will be smooth and without any danger for the vehicle.

Case 2: The operation is the same as in case 1, except in that the relief valve 62 discharges to the reservoir 34. Fluid discharged to reservoir 34 from control chamber 84 refills via flat 104 on stroke pedal release.

However, if during operation the jammed spool valve 26 is rendered to move, a minor difference can be pointed out.

Supposing now the spool valve 26 jammed in its rest position, on the right as illustrated in FIG. 1.

If the spool valve 26 is freed before the input plunger/output plunger engagement, spool valve 26 will slightly move towards the left and the control pressure will fall due to the incompressibility of the fluid contained in the control chamber. Then as the driver pushes the brake pedal, the power boost mechanism reoperates normally under power-on conditions.

If the spool valve 26 is freed after the input plunger/output plunger engagement, spool valve 26 will slightly move towards the left and stop since the input plunger 90 abuts output plunger 88.

In fact, the relief valve has a double main object; On one hand to permit a progressive transition from the hydraulic connection between input plunger and output plunger to the mechanical connection, and on the other hand to obtain a gradual increase of said control pressure with respect to the variation of working pressure since, due to the load of spring 64, the maximum differential of the said pressures cannot be higher than tentatively 4 kg/cm2. It results therefrom that whatever the driver force at the brake pedal and pressure power conditions, actuation of the output piston 282 is always smooth, during power-on conditions and transition from power-off to power-on conditions. Because the hydraulic connections, such as a power boost mechanism, presents a short time-delay of response.

Furthermore, since during power-off condition due to the relief valve 62 the maximum value of the control pressure is notably reduced to be substantially equal to 4 kg/cm2, the displacement of input plunger 90 against said control pressure is facilitated. Thus according to the fact that with a view to obtaining the best input plunger/output piston stroke ratio, the input plunger area is generally larger than the output plunger area, the relief valve prevents the resulting loss of force between the input force at the input plunger and the output force at the output plunger as those skilled in the art will understand.

Case 3: If for any reason the hydraulic system fluid is drained from the valve housing or the servomotor housing, the operation of the power boost mechanism becomes purely mechanical and input plunger 90 pushes output piston 82 via output pluger 88.

The embodiment illustrated in FIG. 2, operates substantially in the same manner as the embodiment shown in FIG. 1; and its operation will not be described.

Finally some modifications may be brought to the above described embodiments.

Firstly, plug 98 is suppressed and stem 100, 300 is slidably received into the housing of the master cylinder, secondly output piston 82 can also assumes the function of a traditional braking system. Obviously, for a split brake system an additional piston yieldably connected to piston 82 would be required as in current tandem master cylinders.

Thirdly outlet port 28 is plugged and the inlet port 22 is connected to a fluid pressure source such as an accumulateur system.

Finally, the flat portion on the output plunger may be avoided and a refill valve is provided in a refill passage communicating working chamber to control chamber, the valve member of which being actuated by the output plunger to cooperate with the valve seat located in said passage, whereby the refill valve is opened when the output plunger is in its rest abutting position, and is closed when the travel of said output plunger from the said rest position reaches a predetermined value. For example, the refill valve comprises a valve member secured to a push rod, the free end of which projecting into the working chamber to be engaged by the output piston.

I claim:

1. In a power boost mechanism:
   housing means defining a working chamber and a control chamber therewithin;
   a piston slidably mounted in said working chamber;
   valve means responsive to a fluid pressure level in said control chamber to shift from a released position venting said working chamber to communicate successively higher fluid pressure levels into said working chamber as said valve means is shifted from said released position;
   an output plunger operatively connected to said piston and slidably received within said control chamber;
   operator-actuated means including an input plunger slidably received within said control chamber, a fluid pressure level in said control chamber varying as a function of the displacement of said plungers within said control chamber;
   said input plunger having a greater transverse cross-sectional area than that of the output plunger, whereby the stroke of the output plunger, is proportionally more than the stroke of the input plunger;
   said input plunger being aligned with said output plunger, whereby upon failure of the fluid pressure level in said control chamber, the input plunger engages the output plunger to permit normal actuation of said piston.

2. The invention of claim 1; and
   conduit means within said housing means communicating said control chamber with said working chamber;
   said output plunger being slidably received in said conduit means.

3. The invention of claim 1:
   said housing means defining a bore therewithin having an inlet port communicating said bore with a fluid pressure source, an outlet port, and a return port communicated to a fluid reservoir, and means communicating the bore to the working chamber;
   said valve means being a spool valve having a reaction surface on one end thereof, said reaction surface being exposed to the fluid pressure level in said control chamber to shift said spool valve to control communication between said ports and to said communicating means to develop fluid pressure in the working chamber when a brake application is effected; and
   resilient means yieldably urging said spool valve to a released position.

4. The invention of claim 3:
   said spool valve having a reaction area opposing said reaction surface said reaction area being communicated to said working pressure whereby the spool valve is shifted against the force of said resilient means when the fluid pressure level in the control chamber exceeds the fluid pressure level in the working chamber by an amount necessary to overcome said resilient means.

5. The invention of claim 4; and
   relief valve means communicating said control chamber with the working chamber when the pressure level in the control chamber exceeds the pressure level in the working chamber by a predetermined amount substantially higher than the pressure differential between the control and working chamber required to overcome said resilient means.

6. The invention of claim 1; and
   resilient means yieldably urging said output plunger into engagement with said input plunger and thereafter urging the input and output plungers as a unit toward a predetermined release position.

7. The invention of claim 6; and
   refill passage means communicating said working chamber with said control chamber when the input and output plungers are disposed in said predetermined release position, and refill passage valve means responsive to movement of said output away from said release position to close communication through said refill passage means.

8. The invention of claim 7; and
   conduit means between the working and control chambers slidably supporting said output plunger, said refill passage means being a flat on said output plunger cooperating with the wall of the conduit means to define said refill passage means, said refill passage valve means including a land on said output plunger cooperating with said conduit means to close communication through the refill passage means when the plungers are moved from their released positions.

9. The invention of claim 1:
   said housing means including a valve housing enclosing said valve means and a servomotor housing separate from said valve housing enclosing the piston and said plungers.

10. The invention of claim 1:
    said valve means being a spool valve defining a bore therewithin;
    said piston, said plungers, and said spool valve being coaxial, said output plunger being received within the bore defined by the spool valve.

11. In a power boost mechanism:
    housing means defining a working chamber and a control chamber therewithin;
    a piston slidably mounted in said working chamber;
    valve means responsive to a fluid pressure level in said control chamber to shift from a released position venting said working chamber to communicate successively higher fluid pressure levels into said working chamber as said valve means is shifted from said released position;

an output plunger operatively connected to said piston and slidably received within said control chamber;

operator-actuated means including an input plunger slidably received within said control chamber, a fluid pressure level in said control chamber varying as a function of the displacement of said plungers within said control chamber;

said input plunger having a greater transverse cross-sectional area than that of the output plunger, whereby the stroke of the output plunger, is proportionally more than the stroke of the input plunger;

relief valve means responsive to the pressure differential between the control chamber and the working chamber to vent the control chamber when said pressure differential between the control and working chambers exceeds a predetermined amount.

12. In a power boost mechanism:

housing means defining a working chamber and a control chamber therewithin;

said chambers being filled with a fluid medium;

a piston slidably mounted in said working chamber and having output plunger means movable with said piston and slidably received within said control chamber;

operator-actuated means including input plunger means slidably received within said control chamber; and valve means responsive to actuation of said operator-actuated means to shift from a released position venting said working chamber to communicate successively higher fluid pressure levels into said chamber as said valve means is shifted from said released position;

said input plunger means and said output plunger means cooperating with the fluid medium in said control chamber so that the stroke of the output plunger is proportionally more than the stroke of the input plunger means upon actuation of the booster by communication of successively higher fluid pressure levels into said working chamber, said input and output plunger means cooperating upon manual actuation of said power boost so that the strokes of the input and output plunger means are equal;

said input plunger being aligned with said output plunger whereby upon failure of the fluid pressure level in said control chamber, the input plunger engages the output plunger to permit normal actuation of said piston.

* * * * *